(12) United States Patent
Giralt

(10) Patent No.: US 11,397,803 B2
(45) Date of Patent: Jul. 26, 2022

(54) REAL-TIME VIDEO SHARING DATA LOSS PREVENTION

(71) Applicant: Cisco Technology, Inc., San Jose, CA (US)

(72) Inventor: Paul Brian Giralt, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 422 days.

(21) Appl. No.: 16/391,504

(22) Filed: Apr. 23, 2019

(65) Prior Publication Data

US 2020/0342131 A1 Oct. 29, 2020

(51) Int. Cl.
```
G06F 21/44      (2013.01)
G06F 21/62      (2013.01)
H04L 65/1069    (2022.01)
H04L 65/403     (2022.01)
G06V 30/40      (2022.01)
```
(Continued)

(52) U.S. Cl.
CPC .......... *G06F 21/44* (2013.01); *G06F 3/0484* (2013.01); *G06F 21/6218* (2013.01); *G06F 40/131* (2020.01); *G06Q 10/103* (2013.01); *G06V 30/40* (2022.01); *H04L 65/1069* (2013.01); *H04L 65/403* (2013.01)

(58) Field of Classification Search
CPC ...... G06Q 10/103; G06Q 10/10; G06F 21/44; G06F 21/31; G06F 21/6209; G06F 3/0484; G06F 3/04842; G06F 40/103; G06F 40/131; G06F 40/143; G06F 40/134; H04L 63/105; G06K 9/00456; G06K 9/3233; G06V 30/413; G06V 10/25
See application file for complete search history.

(56) References Cited

U.S. PATENT DOCUMENTS 5,778,398 A * 7/1998 Nagashima ........... G06F 40/143
                                                          715/244
8,544,060 B1    9/2013 Khetawat
(Continued)

OTHER PUBLICATIONS

Frédéric Dufaux et al., "Privacy Enabling Technology for Video Surveillance", https://infoscience.epfl.ch/record/91037/files/Dufaux2006_1542.pdf, downloaded Dec. 21, 2018, 12 pages.
(Continued)

*Primary Examiner* — Kyung H Shin
(74) *Attorney, Agent, or Firm* — Edell, Shapiro & Finnan, LLC

(57) ABSTRACT

A meeting server provides real-time data loss prevention in an online conference session by obtaining a presentation in a series of video frames to be shared with participants in the online conference session. The meeting server selects a frame of the presentation to process for potential security issues based on a change in the selected frame from at least one previous frame in the presentation. The meeting server provides the selected frame to a data loss prevention system and obtains a determination that the selected frame includes at least one security characteristic that indicates the presentation should not be shared. Based on the determination from the data loss prevention system, the meeting server prevents at least a portion of the presentation from being shared with at least one of the participants in the online conference session.

20 Claims, 5 Drawing Sheets

(51) Int. Cl.
   *G06Q 10/10*     (2012.01)
   *G06F 3/0484*    (2022.01)
   *G06F 40/131*    (2020.01)

(56)         References Cited

U.S. PATENT DOCUMENTS

| | | |
|---|---|---|
| 9,237,170 B2 | 1/2016 | Kiang et al. |
| 9,300,693 B1 | 3/2016 | Manmohan et al. |
| 9,311,499 B2 | 4/2016 | Redlich et al. |
| 9,363,293 B2 | 6/2016 | Das et al. |
| 10,079,835 B1 | 9/2018 | Dodke et al. |
| 2016/0117517 A1* | 4/2016 | Li .................... G06F 21/44 715/273 |
| 2017/0262159 A1* | 9/2017 | Denoue ............. G06F 3/0484 |

OTHER PUBLICATIONS

Personify, "FAQs—ChromaCam", Feb. 19, 2019, 13 pages.
Randy Devlin, "Data Loss Prevention", GIAC (GSEC) Gold Certification, Sep. 6, 2015, 30 pages.
Tribhuvanesh Orekondy et al., "Connecting Pixels to Privacy and Utility: Automatic Redaction of Private Information in Images", arXiv:1712.01066v1 [cs.CV], Dec. 4, 2017, 21 pages.
Personify, "ChromaCam", https://personifyinc.com/products/chromacam, downloaded Mar. 1, 2019, 5 pages.

\* cited by examiner

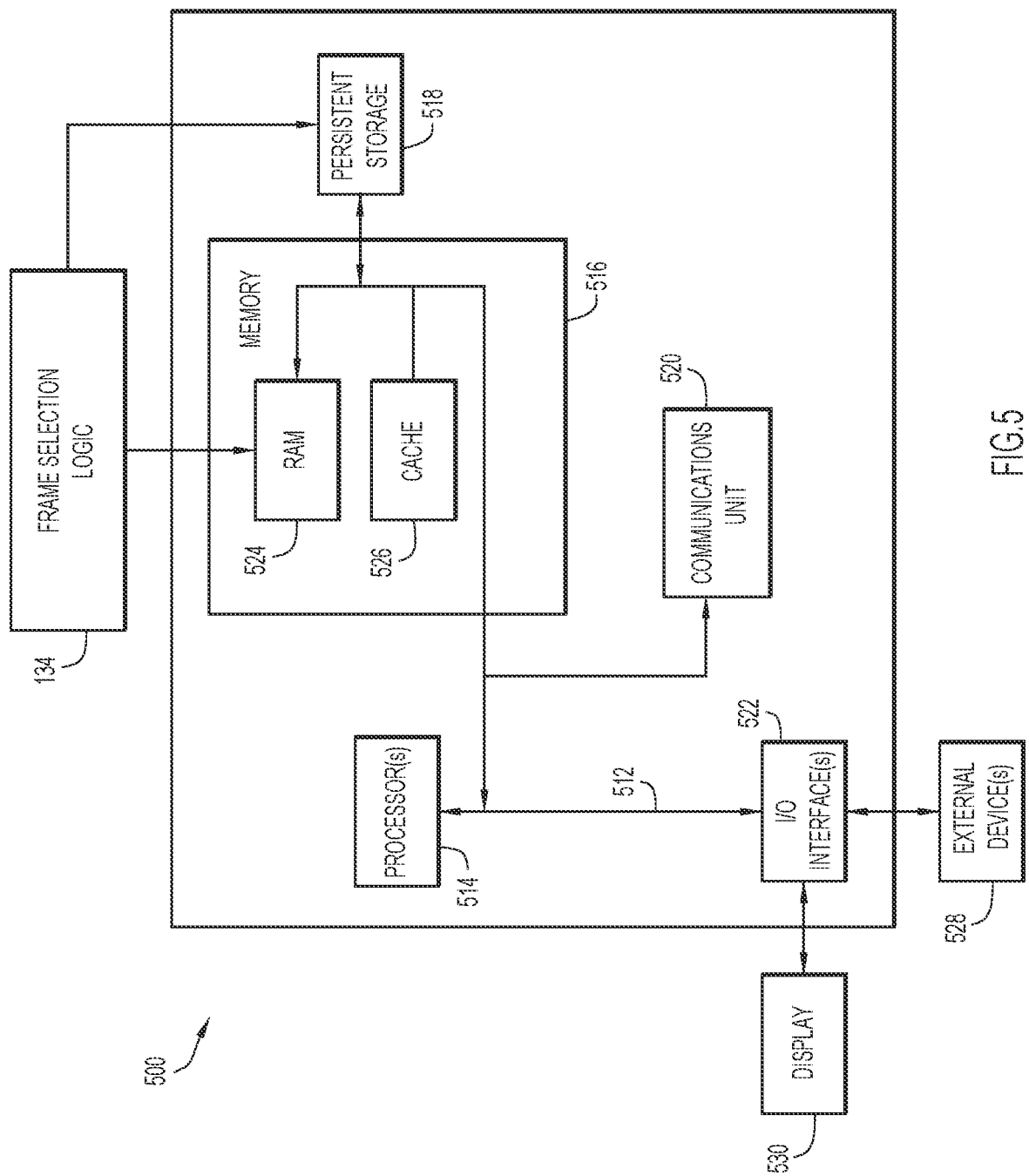

REAL-TIME VIDEO SHARING DATA LOSS PREVENTION

TECHNICAL FIELD

The present disclosure relates to data security in online conference sessions.

BACKGROUND

Sharing of sensitive internal data to unauthorized parties presents a significant issue that enterprises may face. Traditional Data Loss Prevention (DLP) solutions examine documents and files for indications of sensitive information and flag those files and/or restrict access to sensitive files based on a security policy. Some DLP solutions may further process file data to search for obscured indications of sensitive information, such as text indications rendered as image files to circumvent text searching.

Online conference sessions allow participants in the conference session to share screens in real-time, enabling a presenter to disseminate contents of their desktop or application contents. The collaboration tools for online conference sessions, which may be hosted on a meeting server, typically convert the shared screen/application to a video stream that is sent to the participants of the online conference session.

BRIEF DESCRIPTION OF THE DRAWINGS

FIG. 5 illustrates a simplified block diagram of a device that may be configured to perform methods presented herein, according to an example embodiment.

DESCRIPTION OF EXAMPLE EMBODIMENTS

Overview

A method is provided for real-time data loss prevention in an online conference session. The method includes obtaining content, which may be a presentation or other document, to be shared with participants in an online conference session. The content comprises a plurality of video frames. The method also includes selecting a frame of the content to process for potential security issues based on a change in the selected frame from at least one previous frame in the presentation. The method further includes providing the selected frame, and optionally the identities of the meeting participants, to a data loss prevention system and obtaining a determination of the security characteristics of the content being shared based on the selected frame. The conferencing system can then use the security characteristics of the content to determine whether one or more participants in the online conference session should be restricted from viewing the content and preventing those restricted participants from viewing the content.

Example Embodiments

The techniques presented herein minimize the exposure of sensitive information in a real-time video sharing session by periodically parsing frames of the video stream for security characteristics. In one example, a meeting server may perform optical character recognition (OCR) on selected frames of video and pass the converted text data to a Data Loss Prevention (DLP) system, which detects any content that is not authorized for sharing. The DLP system may determine a data classification of the data being shared and based on the participants in the online conference session, determine whether the content should be shared with some or all of the participants.

Figure 1:
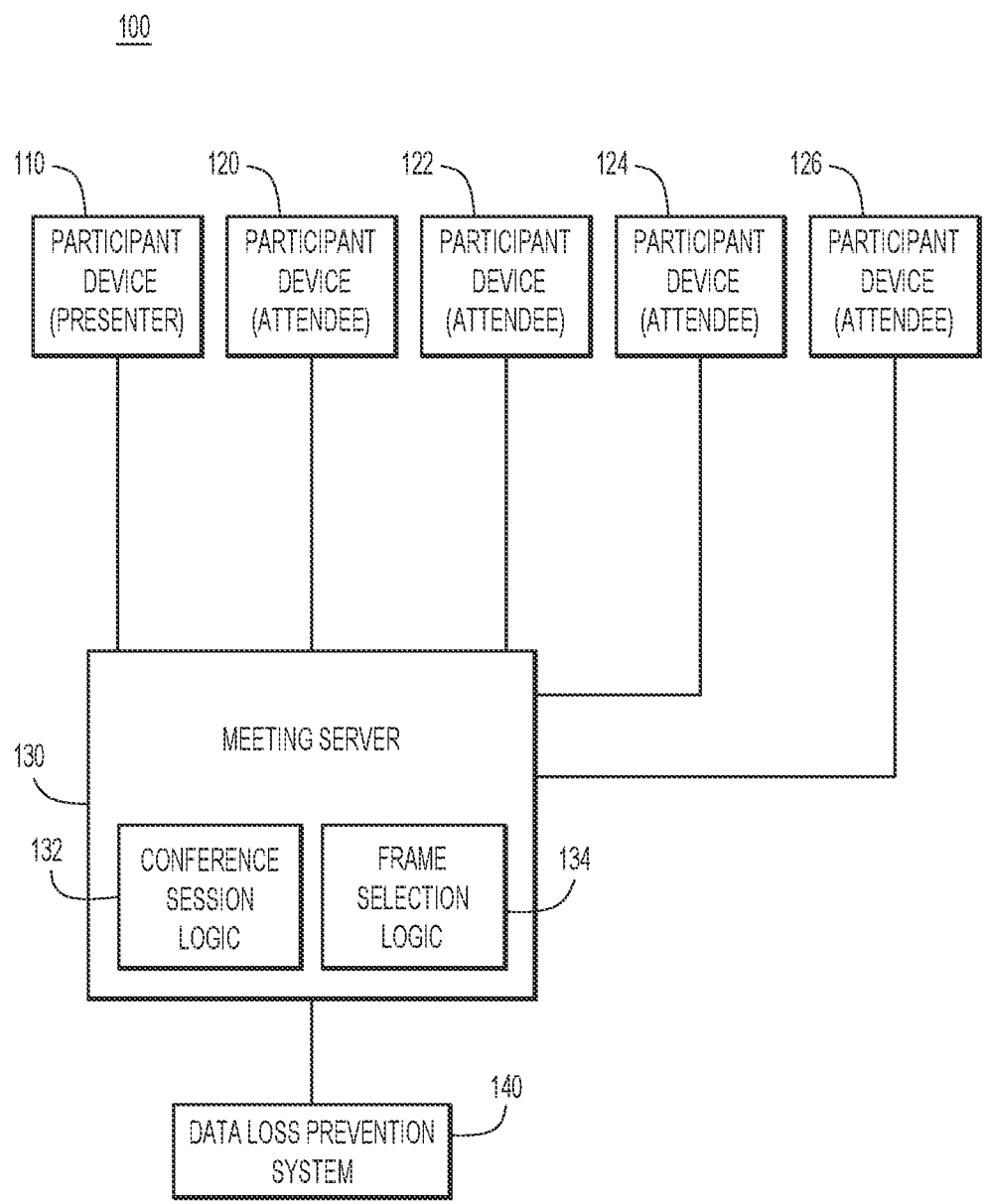
FIG. 1 is a simplified block diagram of an online conference system configured to prevent data loss according to an example embodiment.

Referring now to FIG. 1, a conferencing system 100 is configured to facilitate an online conference session between participant devices 110, 120, 122, 124, and 126. In the online conference session, the participant device 110 is designated as the presenter, which provides content to the participant devices 120, 122, 124, and 126. The participant devices 120, 122, 124, and 126 are designated as attendees, and receive the content shared from the presenter device 110. In one example, the designation of presenter/attendee may vary during the online conference session to allow each of the participants to be the presenter and share content.

The online conference session is mediated by a meeting server 130, which is communicatively coupled to the participant devices 110, 120, 122, 124, and 126. The meeting server 130 includes conference session logic 132, which is configured to handle the communications between the participant devices 110, 120, 122, 124, and 126 in the online conference session. The meeting server also includes frame selection logic 134, which is configured to select frames to be processed for security characteristics according to the techniques described herein. In one example, the meeting server 130 may be a cloud-based server that communicates with the participant devices 110, 120, 122, 124, and 126 through one or more network elements. Alternatively, the functionality of the meeting server 130 may be integrated, in part or in whole, with one of the participant devices 110, 120, 122, 124, and/or 126.

The conferencing system 100 also includes a DLP system 140 communicatively coupled to the meeting server 130. The DLP system 140 is configured to process selected frames (e.g., selected by the frame selection logic 134) from the online conference session to detect security characteristics that may be embedded in the shared content. In one example, the selected frames may be pre-processed (e.g., with OCR) at the meeting server 130, in the DLP system 140, or in an intermediary location not shown in FIG. 1. In another example, the DLP system 140 may be provided by a cloud-based server or service. Additionally, the DLP system 140 may be included as part of the meeting server 130. In another example, the DLP system 140 may be configured as another participant in the online conference session, e.g., a silent participant that may be invisible to the other participants, and may include the frame selection logic 134 to select frames for security processing.

Figure 2:
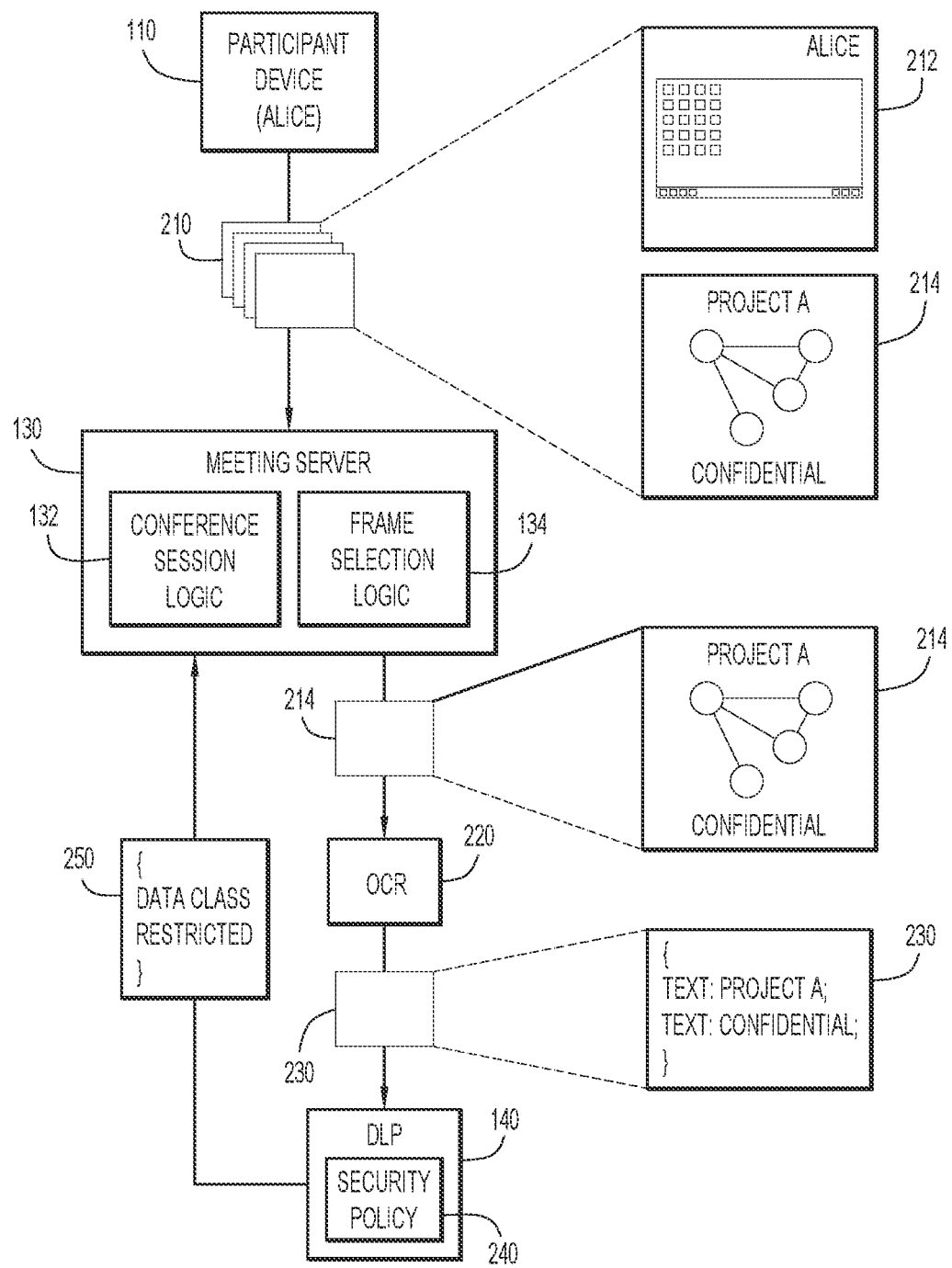
FIG. 2 illustrates an online conference in which a meeting server restricts sharing of a presentation based on security characteristics detected in the presentation, according to an example embodiment.

Referring now to FIG. 2, an example of the meeting server 130 enforcing a security policy from DLP system 140 on shared content is shown. The user of the participant device 110 (e.g., Alice) provides a video stream 210 with the meeting server 130 to share with the other participants (not shown in FIG. 2) in the online conference session. Participant device 110 may also provide a separate video stream featuring a live camera view of Alice. The participant device 110 may designate the video stream 210 as the presentation or content stream. The video stream 210 comprises a plurality of frames, including an initial frame 212 (e.g., showing an image of Alice's computer desktop or of Alice herself) and a subsequent frame 214 (e.g., showing a slide from a presentation on Project A).

The frame selection logic 134 in the meeting server 130 detects a change between the frame 214 and a previous frame (e.g., frame 212) and selects frame 214 to further process for data loss prevention. In one example, the frame selection logic 134 detects that a predetermined number of pixels have changed value by at least a predetermined amount to trigger the selection of frame 214. Alternatively, the frame selection logic may detect a discrete change in the presentation, such as changing applications (e.g., from a live video feed to a shared document), changing slides in a slide-deck presentation, or changing pages in a text document. In another example, the frame selection logic 134 may be configured to always select an initial frame (e.g., frame 212) for data loss prevention processing.

The frame selection logic 134 sends the selected frame 214 to an OCR module 220, which detects any text in the image of the selected frame 214. The OCR module 220 generates a text result 230 indicating any text that is present in the frame 214 (e.g., the text "Project A" and "Confidential"), and sends the text result 230 to be processed by the DLP system 140 for security characteristics. The meeting server 130 may also send the identities of the meeting participants along with the text result 230. The DLP system 140 compares the text result 230 against one or more security policies 240. In one example, the DLP system 140 may determine that the presence of the word "Confidential" indicates that the presentation is restricted and is not authorized to be shared. In another example, the security policy 240 may indicate a group of users that are authorized (or another group of users that are not authorized) to view the presentation. Additionally, the security policy 240 may be specific to certain subject matter, such as allowing only a particular group of users to view subject matter related to Project A.

In another example, the security policy 240 may determine that certain personal information (e.g., social security numbers, credit card information, account numbers, etc.) may be restricted to protect the privacy of an individual or group. In a further example, the DLP system 140 may only determine the security characteristic of the document (e.g., the content is company highly confidential), but does not make a determination as to whether one or more participants should be restricted from viewing the content. In this example the meeting server 130 may make the determination on restricting individual participants from viewing the content, for example, based on additional security policy designating which participants are authorized to view content of different security classifications.

The DLP system 140 generates a data classification 250 (e.g., "Restricted") corresponding to the text results 230 generated from the selected frame 214, and provides the classification 250 to the meeting server 130. Based on the data classification 250, the conference session logic 132 stops sharing the video stream 210 with the participants of the online conference session. In one example, the conference session logic 132 may continue to share the video stream 210 with some of the participant devices that are authorized to view the presentation, as indicated in the classification 250. In one example, the DLP system 140 provides the list of participants allowed to view the content. Alternatively, the DLP system 140 may only provide the data classification to enable the meeting server 130 to make the decision as to whether or not to allow the content based on a local policy. It is computationally impractical to analyze every frame of the video stream 210 with the OCR module 220, but the frame selection logic 134 enables the meeting server 130 to determine which frames are most appropriate to send for further analysis.

In another example, the meeting server 130 may notify the presenter device 110 that the content in video stream 210 includes restricted material that is not authorized to be shared with at least one of the participants in the online conference session. The presenter device 110 or a controller of the online conference session may be allowed to override of the determination of the DLP system 140 that the presentation is restricted, and continue sharing the presentation. For instance, the presenter may have determined that all of the participants of the online conference session have signed a non-disclosure agreement that covers the material in the presentation, which would otherwise restrict sharing the material.

In yet another example, the information from selected frames may be shared with multiple DLP systems to allow participants from multiple organizations to determine what information is shared in the online conference session. For instance, a collaboration between a corporation and a university may be presenting a joint project, and the corporation may have different standards for shareable subject matter than the university. The information from the selected frames may be processed by DLP systems maintained by each of the organizations, allowing both organizations to maintain control over potentially sensitive information.

In a further example, the conference session logic 132 may allow participants to view portions of the shared presentation that are not currently being shared by the presenter. For instance, a participant may be allowed to scroll through the slides of a presentation, such as to remain on a previously presented slide or to skip ahead to future slide. The frame selection logic 134 may detect changes in the video stream being shared with each participant, and select frames for further analysis based on changes in frames being sent to any of the participants.

Figure 3:
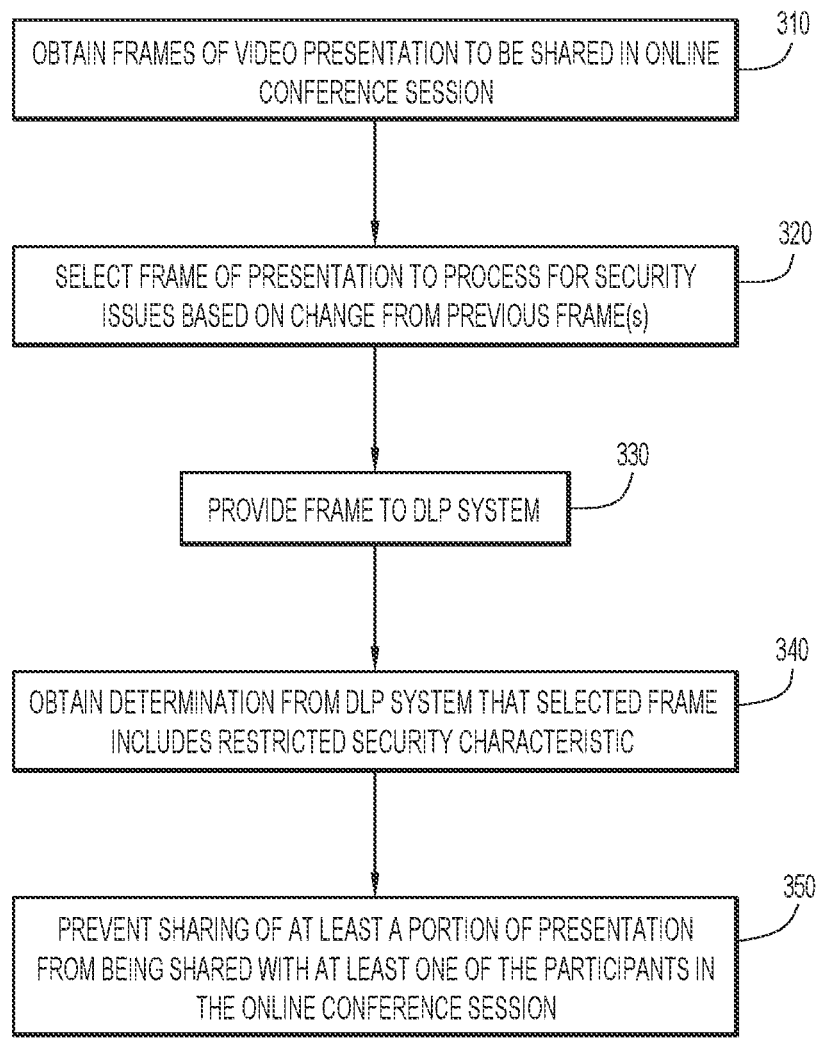
FIG. 3 is a flowchart illustrating operations of a meeting server to prevent data loss in an online conference session, according to an example embodiment.

Referring now to FIG. 3, a flowchart illustrates operations performed at a meeting server (e.g., meeting server) in a process 300 to implement real-time data loss prevention in an online conference session. At 310, the meeting server obtains content to be shared with participants in an online conference session. The content includes a plurality of video frames. At 320, the meeting server selects a frame of the presentation to process for potential security issues. The selection of frame may be based on the frame either being the initial frame of the session or a significant enough change from at least one previous frame in the presentation. In one example, the frame may be selected based on a predetermined threshold of pixels changing values from a previous frame.

At 330, the meeting server provides the selected frame to a data loss prevention system. In one example, some or all of the data loss prevention system may be integrated with the meeting server. At 340, the meeting server obtains a determination from the data loss prevention system that the selected frame includes at least one security characteristic that indicates the presentation should not be shared. In one example, the determination may include an indication of a subset of the participants in the online conference session that are authorized to receive the presentation. In another example, the data loss prevention system may provide a data classification for the document enabling the meeting server to determine which participants are authorized to view the content. At 350, the meeting server prevents at least a portion of the presentation from being shared with at least one of the participants in the online conference session. In one example, the meeting server may block the presentation for some participants because those participants are logged in to the online conference session through an external connection, while allowing local participants to continue viewing the shared content. In another example, the meeting server may block the presentation for certain participants of the online conference session based on an authenticated identity of the participants.

Figure 4:
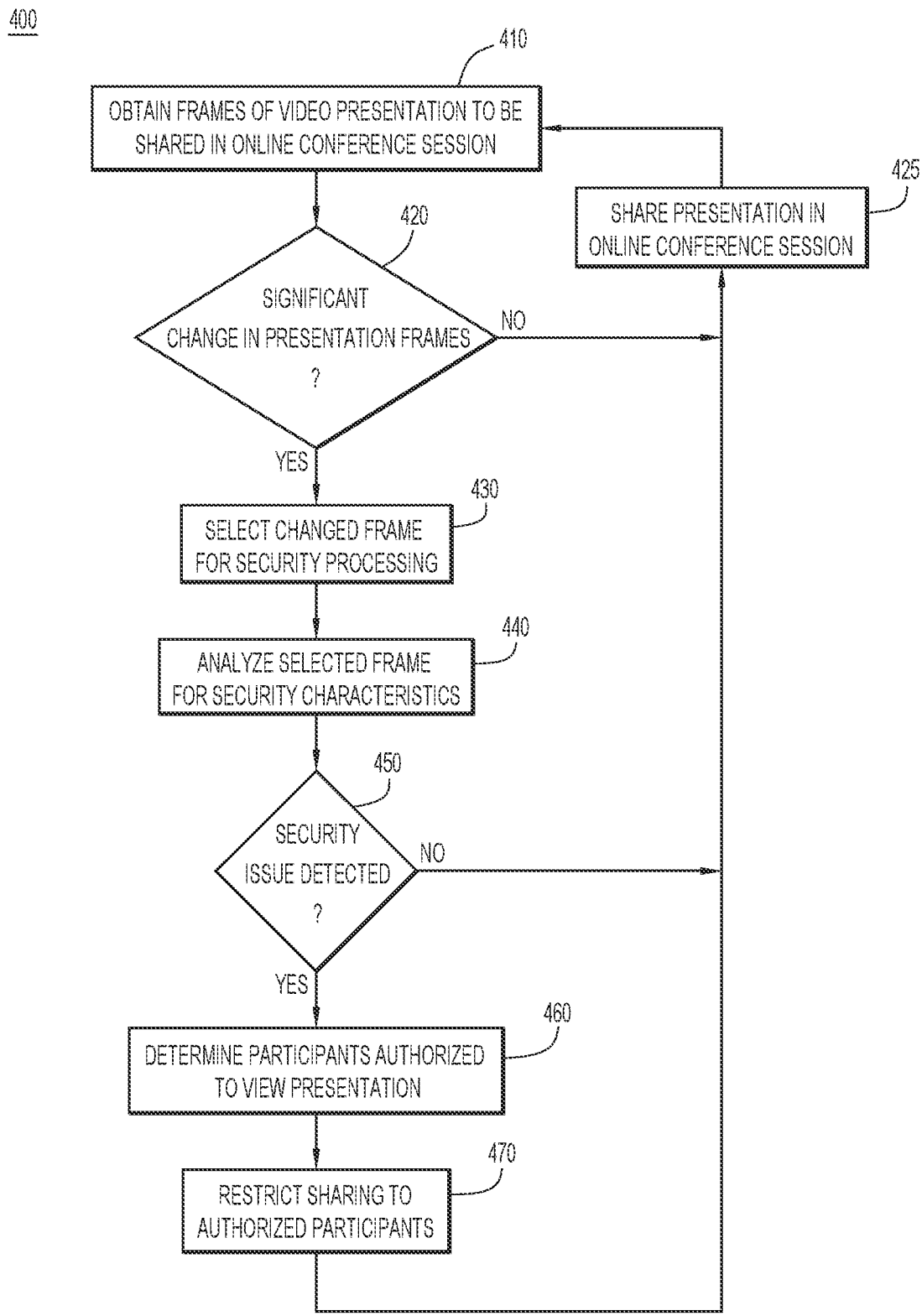
FIG. 4 is a flowchart illustrating operations for sharing a presentation with authorized participants of an online conference session, according to an example embodiment.

Referring now to FIG. 4, a flowchart illustrates operations performed in a process 400 to implement data loss prevention in an online conference session. The method includes obtaining frames of a video presentation to be shared with participants of an online conference session at 410. In one example, the video presentation may comprise a shared screen or a portion of a shared document. If there is no significant change in the frames of the video presentation, as determined at 420, then the presentation is shared with the participants of the online conference session at 425. In one example, a significant change in between frames of the presentation may include a discrete change, such as navigating to a new slide or page in a document, or a continuous change that reaches a predetermined level, such as 20% of the pixels in the frame changing values by at least 10% with respect to the corresponding pixels in any of the previous four frames.

If there is a significant change in a frame of the video presentation, that frame is selected for security processing at 430. At 440, the selected frame is analyzed for security characteristics that may indicate a security issue. In one example, the selected frame may be processed by an OCR module to extract text from the selected frame. The text from the frame may then be compared against a security policy to recognize security characteristics of the presentation. If there is no security issue detected, as determined at 450, the presentation is shared with the participants of the online conference session at 425.

If a security issue is detected at 450, such as text from the selected frame matching a security policy, then the data loss prevention system determines which participants are authorized to view the presentation at 460. Alternatively, the data loss prevention system may provide information about the security issue to the meeting server enabling the meeting server to determine at 460 which participants are authorized to view the presentation. In one example, the security policy may indicate that the presentation is unauthorized for the all of the participants of the online conference session. Alternatively, the security policy may specify a certain class of participants that are authorized to view the presentation or another class of participants that are not authorized to view the presentation. In another example, if the data loss prevention system is provided with identities of the participants, the data loss prevention system may communicate to the meeting server which specific participants are allowed or not allowed to view the content.

At 470, the meeting server restricts sharing the presentation to the authorized participants before sharing the presentation in the online conference session at 425. In one example, the meeting server may also notify the participant that provided the presentation that some or all of the participants in the online conference session are not authorized to view the presentation. In another example, the security policy may authorize a group of participants to view a portion of the presentation, while restricting a different portion of the presentation. For instance, the security policy may restrict the shared video presentation while a confidential material is being shared, but continue the video presentation as soon as the confidential material is no longer being shared. Additionally, the meeting server may be configured to block content for the remainder of the meeting after the security violation has been encountered, even if the restricted content is no longer detected in subsequent frames of the content sharing session.

Referring now to FIG. 5, a hardware block diagram illustrates a computing device 500 that may perform the functions of any of the servers or computing or control entities referred to herein in connection with the online conference system and/or the data loss prevention system described herein. It should be appreciated that FIG. 5 provides only an illustration of one embodiment and does not imply any limitations with regard to the environments in which different embodiments may be implemented. Many modifications to the depicted environment may be made.

As depicted, the device 500 includes a bus 512, which provides communications between computer processor(s) 514, memory 516, persistent storage 518, communications unit 520, and input/output (I/O) interface(s) 522. Bus 512 can be implemented with any architecture designed for passing data and/or control information between processors (such as microprocessors, communications and network processors, etc.), system memory, peripheral devices, and any other hardware components within a system. For example, bus 512 can be implemented with one or more buses.

Memory 516 and persistent storage 518 are computer readable storage media. In the depicted embodiment, memory 516 includes random access memory (RAM) 524 and cache memory 526. In general, memory 516 can include any suitable volatile or non-volatile computer readable storage media. Instructions for the Frame selection logic 134 may be stored in memory 516 or persistent storage 518 for execution by processor(s) 514.

One or more programs may be stored in persistent storage 518 for execution by one or more of the respective computer processors 514 via one or more memories of memory 516. The persistent storage 518 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 518 may also be removable. For example, a removable hard drive may be used for persistent storage 518. Other examples include optical and magnetic disks, thumb drives, and smart cards that are inserted into a drive for transfer onto another computer readable storage medium that is also part of persistent storage 518.

Communications unit 520, in these examples, provides for communications with other data processing systems or devices. In these examples, communications unit 520 includes one or more network interface cards. Communications unit 520 may provide communications through the use of either or both physical and wireless communications links.

I/O interface(s) 522 allows for input and output of data with other devices that may be connected to computer device 500. For example, I/O interface 522 may provide a connection to external devices 528 such as a keyboard, keypad, a touch screen, and/or some other suitable input device. External devices 528 can also include portable computer readable storage media such as database systems, thumb drives, portable optical or magnetic disks, and memory cards.

Software and data used to practice embodiments can be stored on such portable computer readable storage media and can be loaded onto persistent storage 518 via I/O interface(s) 522. I/O interface(s) 522 may also connect to a display 530. Display 530 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In summary, the techniques presented herein prevent exposure of sensitive data to unauthorized parties by monitoring video sharing sessions in real-time, extracting characteristics of the video (e.g., text data), and providing the extracted characteristics to a Data Loss Prevention system to determine if any of the content being shared should be blocked from specific participants. Policies may be used to determine appropriate action to be taken in the event of detecting sensitive data, such as blocking the content entirely, notifying administrators/content managers, and/or blocking the content for unauthorized users only.

In one form, a method is provided for real-time data loss prevention in an online conference session. The method comprises obtaining a presentation to be shared with participants in an online conference session. The presentation comprises a plurality of video frames. The method also includes selecting a frame of the presentation to process for potential security issues based on a change in the selected frame from at least one previous frame in the presentation. The method further includes providing the selected frame to a data loss prevention system and obtaining a determination that the selected frame includes at least one security characteristic that indicates the presentation should not be shared. The method includes preventing at least a portion of the presentation from being shared with at least one of the participants in the online conference session.

Additionally, the method may include selecting the frame based on detecting a discrete change in at least a portion of the presentation. The discrete change may be a change of slides in a slide-deck presentation or a page change in a text-based document. Selecting the frame may also be based on detecting a predetermined number of pixels in the selected frame changing values from corresponding pixels in a previous frame. The method may further include processing the selected frame by optical character recognition. Further, the security characteristic that indicates the presentation should not be shared may be specific to a subset of the participants in the online conference session, and the method may include preventing at least a portion of the presentation from being shared with the subset of the participants in the online conference session that is not authorized to view that portion of the presentation. Further still, the method may include implementing the data loss prevention system as one of the participants in the online conference session.

In another form, an apparatus comprising a network interface and a processor is provided. The network interface is configured to communicate with computing devices across one or more computer networks. The processor is configured to obtain a presentation comprising a plurality of video frames to be shared with participants in an online conference session. The processor is also configured to select a frame of the presentation to process for potential security issues based on a change in the selected frame from at least one previous frame in the presentation. The processor is further configured to provide the selected frame to a data loss prevention system and obtain a determination that the selected frame includes at least one security characteristic that indicates the presentation should not be shared. The processor is also configured to prevent at least a portion of the presentation from being shared with at least one of the participants in the online conference session.

In yet another form, a non-transitory computer readable storage media is provided that is encoded with instructions that, when executed by a processor, cause the processor to obtain a presentation comprising a plurality of video frames to be shared with participants in an online conference session. The instructions also cause the processor to select a frame of the presentation to process for potential security issues based on a change in the selected frame from at least one previous frame in the presentation. The instructions further cause the processor to provide the selected frame to a data loss prevention system and obtain a determination that the selected frame includes at least one security characteristic that indicates the presentation should not be shared. The instructions also cause the processor to prevent at least a portion of the presentation from being shared with at least one of the participants in the online conference session.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presented embodiments.

Aspects of the present embodiments are described herein with reference to flowchart illustrations and/or block diagrams of methods, apparatus (systems), and computer program products according to presented embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various presented embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   initiating an online conference session between a plurality of participant devices;
   obtaining a presentation to be shared by a presenter device during the online conference session, the presentation comprising a plurality of video frames shared with the plurality of participant devices;
   selecting a frame of the presentation to process for potential security issues based on a change in the selected frame from at least one previous frame in the presentation, the selected frame including an image of a portion of a shared document;
   providing the selected frame to a data loss prevention system while the at least one previous frame in the presentation is shared with the plurality of participant devices;
   obtaining a determination from the data loss prevention system during the online conference session, the determination indicating that the selected frame includes at least one security characteristic that indicates the portion of the shared document should not be shared; and
   preventing the portion of the shared document from being shared with at least one of the participant devices in the online conference session.

2. The method of claim 1, wherein selecting the frame is based on detecting a discrete change in at least a portion of the presentation.

3. The method of claim 2, wherein detecting the discrete change comprises detecting a change of slides in a slide-deck presentation or detecting a page change in a text-based document.

4. The method of claim 1, wherein selecting the frame is based on detecting a predetermined number of pixels in the selected frame changing values from corresponding pixels in the at least one previous frame.

5. The method of claim 1, further comprising processing the image of the portion of the shared document with optical character recognition.

6. The method of claim 1, wherein the at least one security characteristic that indicates the portion of the shared document should not be shared is specific to a subset of the participant devices in the online conference session, and further comprising preventing the portion of the shared document from being shared with the subset of the participant devices in the online conference session.

7. The method of claim 1, wherein the data loss prevention system is one of the participant devices in the online conference session.

8. An apparatus comprising:
   a network interface configured to communicate with computing devices across one or more computer networks; and
   a processor and a memory configured to:
   initiate an online conference session between a plurality of participant devices through the network interface;
   obtain a presentation to be shared by a presenter device during the online conference session, the presentation comprising a plurality of video frames shared with the plurality of participant devices;
   select a frame of the presentation to process for potential security issues based on a change in the selected frame from at least one previous frame in the presentation, the selected frame including an image of a portion of a shared document;

provide the selected frame to a data loss prevention system while the at least one previous frame in the presentation is shared with the plurality of participant devices;

obtain a determination from the data loss prevention system during the online conference session, the determination indicating that the selected frame includes at least one security characteristic that indicates the portion of the shared document should not be shared; and prevent the portion of the shared document from being shared with at least one of the participant devices in the online conference session.

9. The apparatus of claim 8, wherein the processor is configured to select the frame by detecting a discrete change in at least a portion of the presentation.

10. The apparatus of claim 9, wherein the processor is configured to detect the discrete change by detecting a change of slides in a slide-deck presentation or detecting a page change in a text-based document.

11. The apparatus of claim 8, wherein the processor is configured to select the frame based on detecting a predetermined number of pixels in the selected frame changing values from corresponding pixels in the at least one previous frame.

12. The apparatus of claim 8, wherein the processor is further configured to process the image of the portion of the shared document with optical character recognition.

13. The apparatus of claim 8, wherein the at least one security characteristic that indicates the portion of the shared document should not be shared is specific to a subset of the participant devices in the online conference session, and wherein the processor is further configured to prevent the portion of the shared document from being shared with the subset of the participant devices in the online conference session.

14. The apparatus of claim 8, wherein the processor is configured to share the presentation with the data loss prevention system as one of the participant devices in the online conference session.

15. One or more non-transitory computer readable storage media encoded with instructions that, when executed by a processor of a computing device operating an online conference session, cause the processor to comprising:

initiate an online conference session between a plurality of participant devices;

obtain a presentation to be shared by a presenter device during the online conference session, the presentation comprising a plurality of video frames shared with the plurality of participant devices;

select a frame of the presentation to process for potential security issues based on a change in the selected frame from at least one previous frame in the presentation, the selected frame including an image of a portion of a shared document;

provide the selected frame to a data loss prevention system while the at least one previous frame in the presentation is shared with the plurality of participant devices;

obtain a determination from the data loss prevention system during the online conference session, the determination indicating that the selected frame includes at least one security characteristic that indicates the portion of the shared document should not be shared; and prevent the portion of the shared document from being shared with at least one of the participant devices in the online conference session.

16. The non-transitory computer readable storage media of claim 15, further comprising instructions operable to cause the processor to select the frame by detecting a discrete change in at least a portion of the presentation.

17. The non-transitory computer readable storage media of claim 16, further comprising instructions operable to cause the processor to detect the discrete change by detecting a change of slides in a slide-deck presentation or detecting a page change in a text-based document.

18. The non-transitory computer readable storage media of claim 15, further comprising instructions operable to cause the processor to select the frame based on detecting a predetermined number of pixels in the selected frame changing values from corresponding pixels in the at least one previous frame.

19. The non-transitory computer readable storage media of claim 15, further comprising instructions operable to cause the processor to process the image of the portion of the shared document with optical character recognition.

20. The non-transitory computer readable storage media of claim 15, further comprising instructions operable to cause the processor to share the presentation with the data loss prevention system as one of the participant devices in the online conference session.

* * * * *